(12) United States Patent
Qin

(10) Patent No.: US 8,373,309 B2
(45) Date of Patent: Feb. 12, 2013

(54) SYSTEMS AND METHODS FOR ASYNCHRONOUS SAMPLING DATA CONVERSION

(75) Inventor: Jianchun Qin, Norristown, PA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 742 days.

(21) Appl. No.: 12/554,057

(22) Filed: Sep. 4, 2009

(65) Prior Publication Data

US 2011/0043045 A1 Feb. 24, 2011

Related U.S. Application Data

(60) Provisional application No. 61/235,109, filed on Aug. 19, 2009.

(51) Int. Cl.
*H02J 1/00* (2006.01)

(52) U.S. Cl. ............... 307/85; 307/87; 363/16; 324/77; 361/93

(58) Field of Classification Search .................. 307/85, 307/87; 363/16; 361/93; 341/144; 324/77
See application file for complete search history.

(56) References Cited

U.S. PATENT DOCUMENTS

| | | | |
|---|---|---|---|
| 4,563,637 A * | 1/1986 | De Bortoli et al. ........ | 324/76.17 |
| 4,636,909 A | 1/1987 | Brandt | |
| 4,672,501 A | 6/1987 | Bilac | |
| 4,715,000 A | 12/1987 | Premerlani | |
| 4,829,298 A | 5/1989 | Fernandes | |
| 5,006,846 A | 4/1991 | Granville | |
| 5,068,667 A * | 11/1991 | Mizoguchi ............ | 342/362 |
| 5,224,011 A * | 6/1993 | Yalla et al. ............ | 361/93.2 |
| 5,398,029 A | 3/1995 | Toyama | |
| 5,446,682 A | 8/1995 | Janke | |
| 5,495,432 A * | 2/1996 | Ho ................... | 708/313 |
| 5,498,956 A | 3/1996 | Kinney | |
| 5,592,393 A | 1/1997 | Yalla | |
| 5,801,654 A * | 9/1998 | Traylor ............... | 341/144 |
| 5,805,395 A | 9/1998 | Hu | |
| 5,809,045 A | 9/1998 | Adamiak | |
| 5,995,911 A | 11/1999 | Hart | |
| 6,141,196 A | 10/2000 | Premerlani | |
| 6,148,267 A | 11/2000 | Premerlani | |
| 6,236,949 B1 | 5/2001 | Hart | |
| 6,311,307 B1 | 10/2001 | Adamiak | |
| 6,426,856 B1 | 7/2002 | Schneerson | |
| 6,446,682 B1 | 9/2002 | Viken | |

(Continued)

OTHER PUBLICATIONS

PCT/US2010/042597, Patent Cooperation Treaty, International Search Report and Written Opinion of the International Searching Authority, Sep. 15, 2010.

(Continued)

*Primary Examiner* — Jared Fureman
*Assistant Examiner* — Alfonso Perez Borroto
(74) *Attorney, Agent, or Firm* — Stoel Rives LLP

(57) ABSTRACT

Disclosed herein are systems and methods for converting data samples representing alternating electric currents. The data samples may be obtained by sampling a first alternating electric current having a first frequency at a sampling frequency, sampling a second alternating electric current having a second frequency at the sampling frequency, and converting the data samples using a conversion algorithm to compensate for any discrepancy caused by the difference between the first frequency and the second frequency. The corrected data samples may be utilized to determine various characteristics of the alternating electric current, such as voltage magnitude, voltage phase angle, current magnitude, current phase angle, and other related attributes. In one application, the systems and methods disclosed herein may be utilized in connection with an intelligent electronic device used to couple a first electrical system, such as a power generator, to a second electrical system, such as a utility intertie.

22 Claims, 10 Drawing Sheets

U.S. PATENT DOCUMENTS

| | | | |
|---|---|---|---|
| 6,456,947 | B1 | 9/2002 | Adamiak |
| 6,571,182 | B2 | 5/2003 | Adamiak |
| 6,603,298 | B2 | 8/2003 | Guzman-Casillas |
| 6,662,124 | B2 | 12/2003 | Schweitzer, III |
| 6,782,058 | B1* | 8/2004 | Nayler .......................... 375/324 |
| 6,845,333 | B2 | 1/2005 | Anderson |
| 6,934,654 | B2 | 8/2005 | Benmouyal |
| 7,112,944 | B1* | 9/2006 | Kojori ............................ 322/29 |
| 7,236,110 | B2* | 6/2007 | Antonesei ....................... 341/61 |
| 7,328,114 | B2 | 2/2008 | Premerlani |
| 7,468,593 | B2* | 12/2008 | Yalla et al. ................... 318/600 |
| 2001/0012984 | A1 | 8/2001 | Adamiak |
| 2003/0218887 | A1* | 11/2003 | Kojori et al. ................... 363/16 |
| 2004/0186669 | A1 | 9/2004 | Benmouyal |
| 2006/0052958 | A1 | 3/2006 | Hancock |
| 2006/0232249 | A1* | 10/2006 | Kojori ............................ 322/29 |
| 2007/0008033 | A1 | 1/2007 | Okazaki |
| 2007/0086134 | A1 | 4/2007 | Zweigle |
| 2008/0238208 | A1* | 10/2008 | Potter et al. ..................... 307/75 |
| 2008/0243404 | A1 | 10/2008 | Banhegyesi |

OTHER PUBLICATIONS

Benmouyal, Gabriel,IEEE Transactions on Power Delivery, vol. 10, No. 2, Removal of DC-Offset in Current Waveforms Using Digital Mimic Filtering, Apr. 1995.

Hou, Daqing; Schweitzer Engineering Laboratories, Inc., Relay Element Performance During Power System Frequency Excursions, 2007.

A.g. Phadke Fellow, IEEE VPI & SU; J.S. Thorp Senior Member, IEEE Cornell University; M.G. Adamiak Member, IEEE AEP Serv. Corp., IEEE Transactions on Power Apparatus and Systems, vol. PAS-102 No. 3 May 1983, A New Measurement Technique for Tracking Voltage Phasors, Local System Frequency and Rate of Change of Frequency, 1983.

Hou, Daqing; Schweitzer Engineering Laboratories, Inc.; E.O. Schweitzer, III; Schweitzer Engineering Laboratories, Inc., Presented for 47th Annual Georgia Tech Protective Relaying Conference in Atlanta, GA, Filtering for Protective Relays, Apr. 28-30, 1993.

T.S. Sidhu, M.S. Sachdev; Power System Research Group University of Saskatchewan, IEEE, An Iterative DSP Technique for Tracking Power System Frequency and Voltage Phasors, 1996.

Liancheng Wang, Senior Member, IEEE; ABB Power Automation & Protection Division, IEEE Transactions on Power Delivery, vol. 14, No. 1, Frequency Responses of Phasor-based Microprocessor Relaying Algorithms, Jan. 1999.

Benmouyal, Gabriel, IEEE Transactions on Power Delivery, vol. 4, No. 3, An Adaptive Sampling-Interval Generator for Digital Relaying, Jul. 1989.

Bijoy Chattopadhyay, Chavdar Ivanov; Mehta Tech, Inc.; M.S. Schdev, University of Saskatchewan, IEEE 1996, A New Frequency Measurement Algorithm in the Presence of Harmonics Using Instantaneous Phasor Quantites.

P J Moore, J H Allmeling and A T Johns, Senior Member IEEE; School of Electronic and Eletrical Engineering Univerisyt of Bath, IEEE1996, Frequency Relaying Based on Instantaneous Frequency Measurement.

M.S. Sachdev, Senior member of IEEE, M.A. Baribeau, Student member of IEEE and Power Systems Research Group of University of Saskatchewan, IEEE Transactions on Power Apparatus and Systems, vol. PAS-98, No. 6, A New Algorithm for Ditigal Impedance Relays, Nov./Dec. 1979.

Dr. Tevfik Sezi; Siemens Power Transmission and Distribution, LLC, A New Method for Measuring Power System Frequency.

Gerard Stenbakken and Tom Nelson, National Institute of Standards and Technology, Gaithersburg, MD, and Ming Zhou and Virgilio Centeno, Proceedings of the 41st Hawaii International Conference on System Sciences-2008, Reference Values for Dynamic Calibration of PMUs, 2008.

Jun-Zhe Yang and Chih-Wen Liu, IEEE Transations on Power Delivery, vol. 15, No. 2, A Precise Calculation of Power System Frequency and Phasor, 2000.

Maohai Wang, and Yuanzhang Sun, Senior Member, IEEE, A Practical, Precise Method for Frequency Tracking and Phasor Estimation, IEEE Transactions on Power Delivery, vol. 19, No. 4, Oct. 2004.

* cited by examiner

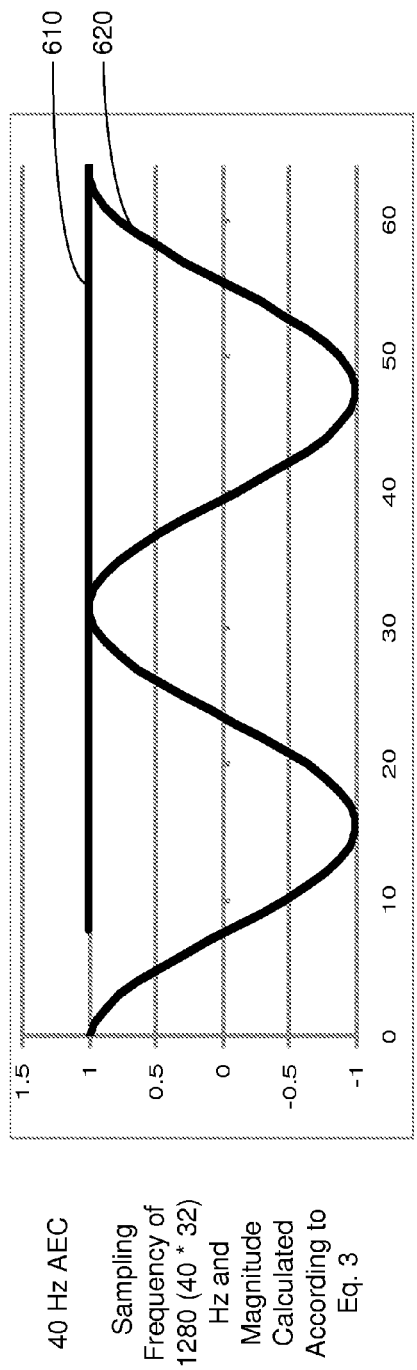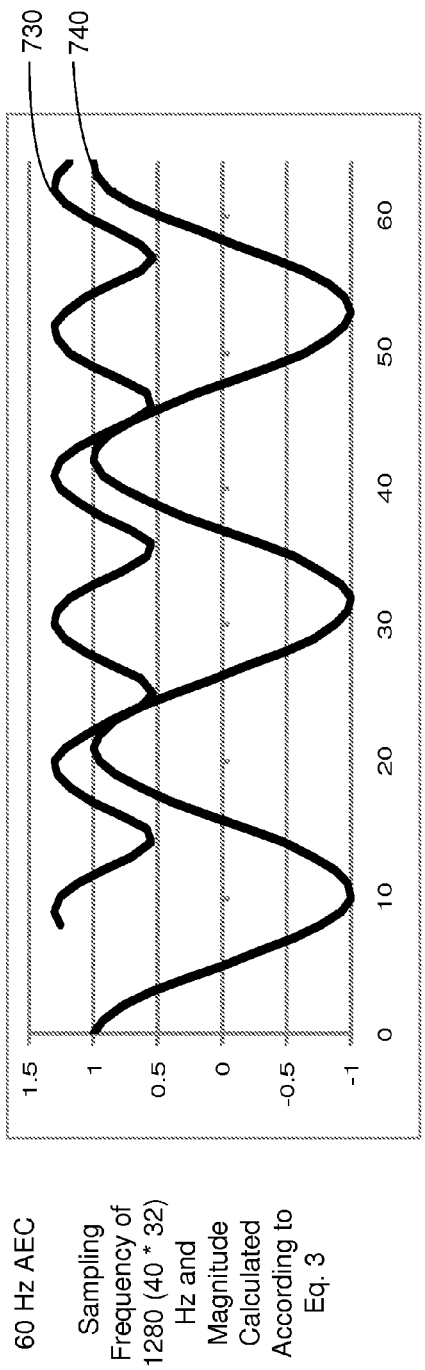

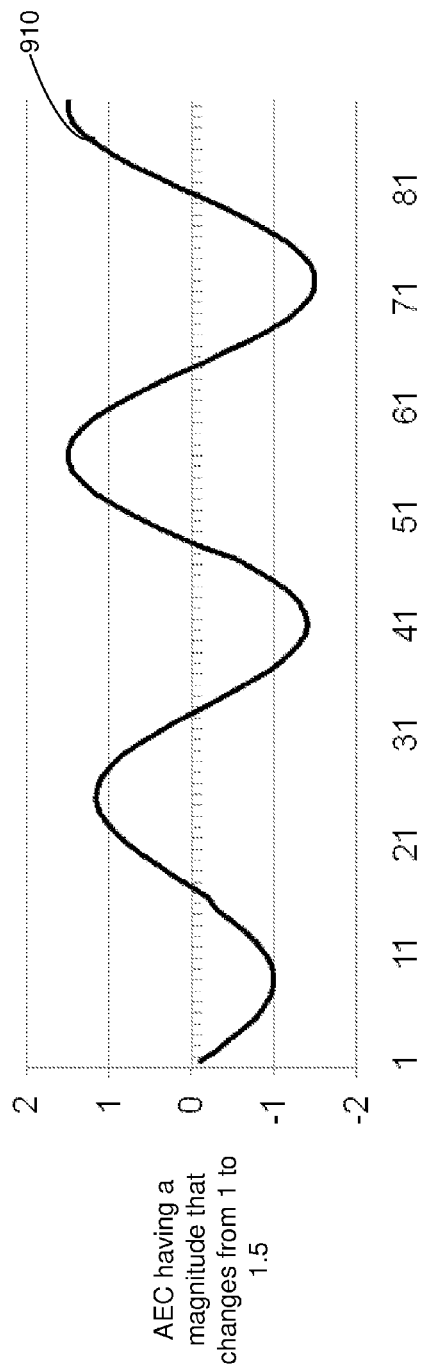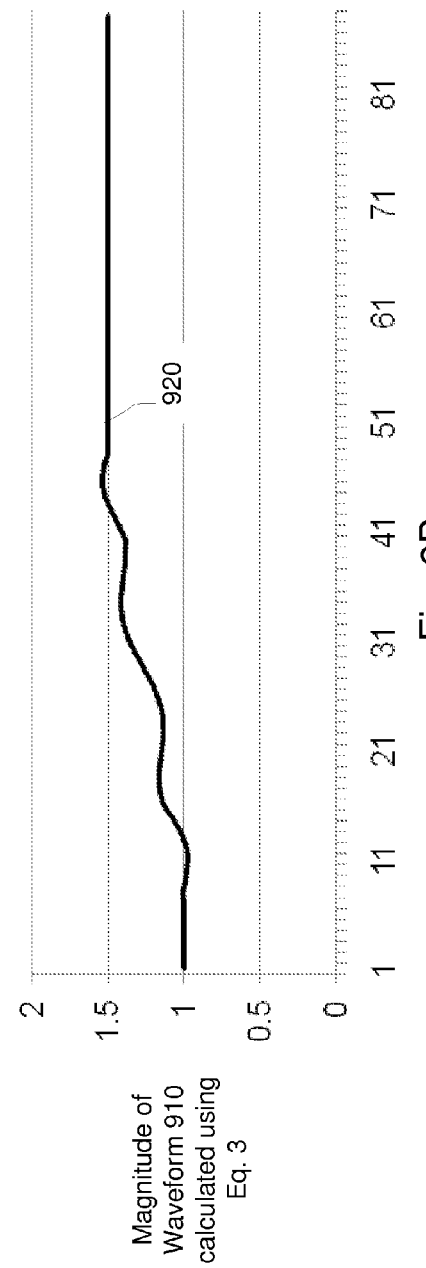
Fig. 9A
AEC having a magnitude that changes from 1 to 1.5
Fig. 9B
Magnitude of Waveform 910 calculated using Eq. 3

SYSTEMS AND METHODS FOR ASYNCHRONOUS SAMPLING DATA CONVERSION

RELATED APPLICATION

This application claims the benefit under 35 U.S.C. §119 of U.S. Provisional Application No. 61/235,109, filed 19 Aug. 2009, naming Jianchun Qin as inventor, which is incorporated by reference herein in its entirety.

TECHNICAL FIELD

This disclosure relates to the sampling and processing of data representing alternating electric currents. More particularly, this disclosure relates to sampling a first alternating electric current having a first frequency at a sampling frequency, sampling a second alternating electric current having a second frequency at the sampling frequency, and then converting the data samples using a conversion algorithm to compensate for any discrepancy caused by the difference between the first frequency and the second frequency.

BRIEF DESCRIPTION OF THE DRAWINGS

Additional aspects and advantages will be apparent from the following detailed description of preferred embodiments, which proceeds with reference to the accompanying drawings.

FIG. 6 illustrates a 40 Hertz waveform reconstructed from data samples taken at a sampling frequency of 1280 (40*32) Hertz and a calculated magnitude of the waveform, according to one embodiment.

FIG. 7 illustrates a 60 Hertz waveform reconstructed from data samples taken at a sampling frequency of 1280 (40*32) Hertz and a calculated magnitude of the waveform, according to one embodiment.

FIG. 9A illustrates a 60 Hertz waveform whose magnitude changes from 1 to 1.5 reconstructed from data samples converted by an asynchronous data sampling conversion method as described herein, according to one embodiment.

FIG. 9B illustrates a magnitude calculation from the data samples of FIG. 9A, according to one embodiment.

Figure 1:
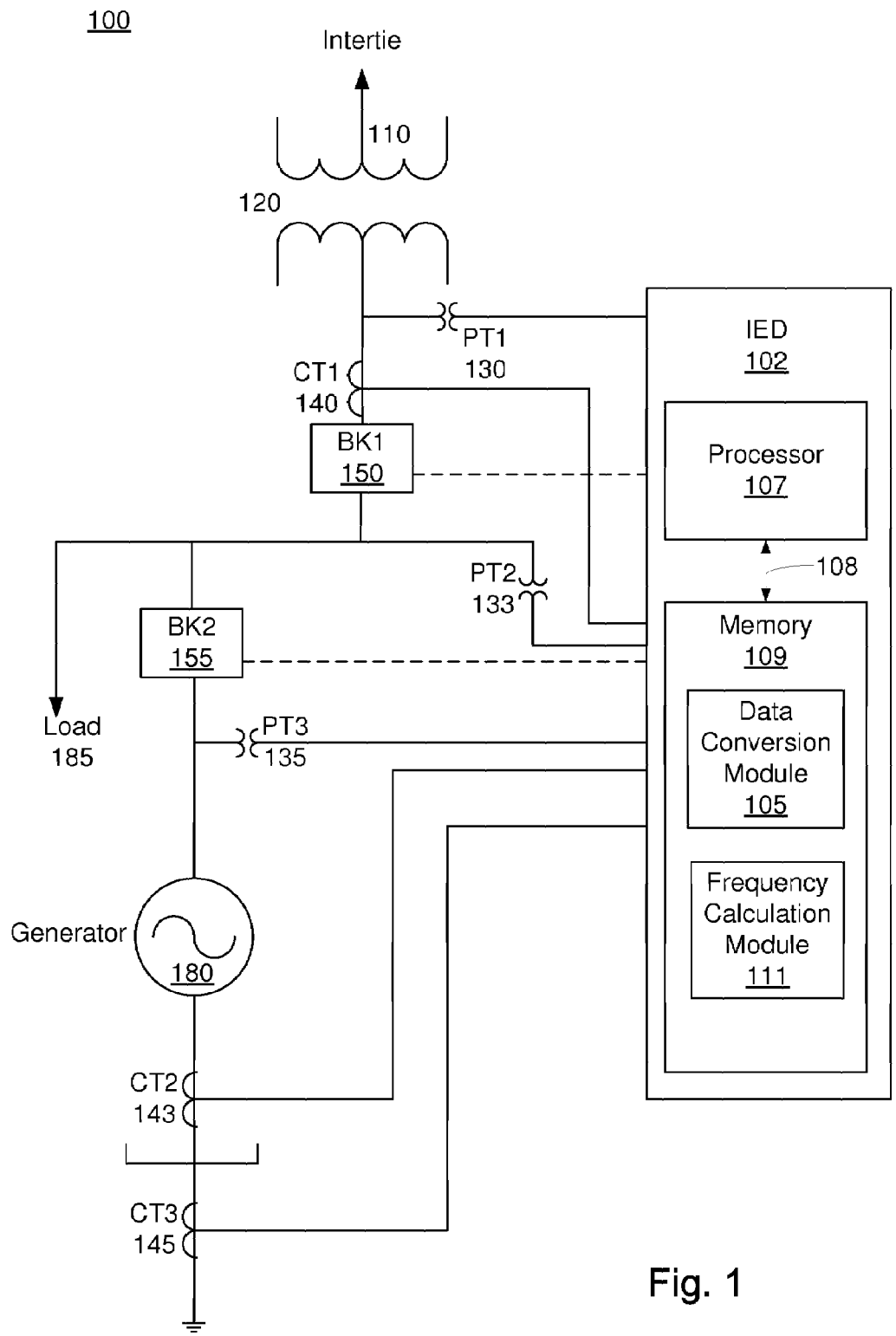
FIG. 1 is a diagram of an intelligent electronic device configured to monitor and/or protect a generator and an intertie, according to one exemplary embodiment.

In the following description, numerous specific details are provided for a thorough understanding of the various embodiments disclosed herein. However, those skilled in the art will recognize that the teachings disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

When connecting an electrical generator to an intertie, the magnitude, frequency and phase of an alternating electric current (AEC) produced by the generator are approximately synchronized to the magnitude, frequency, and phase of the current carried on the intertie. Damage may result to the generator or other equipment if the generator is not synchronized before it is connected. A protective device, such as an intelligent electronic device (IED) may be configured to monitor the generator and to determine when conditions are appropriate to connect or disconnect the generator from the intertie. The IED may monitor characteristics of the AEC produced by the generator and the AEC carried by the intertie, such as voltage magnitude, voltage frequency, voltage phase angle, current phase angle, current frequency, and other related attributes.

In one application, the systems and methods disclosed herein may be utilized in connection with an IED used to monitor and selectively connect an intermittent power generator, such as a wind turbine, to a utility intertie. In the case of a wind turbine, changing wind conditions may cause an associated electrical generator to start and stop periodically. When a generator starts up, the frequency of an AEC produced by the generator is proportional to the rotation of the generator's input. Accordingly, the IED may be configured to determine when the electrical attributes of the AEC produced by the generator are suitable for connecting to the utility intertie. Of course, a variety of types of electrical generators may also be used in connection with the systems and methods disclosed herein.

In another application, the systems and methods disclosed herein may be utilized in connection with an IED used to monitor and selectively connect two islanded portions of an electric power distribution system. In such an application, the IED may be configured to determine when the electrical attributes of one islanded portion of the electric power distribution system are suitable for connection to another islanded portion of the electric power distribution system.

Disclosed herein are systems and methods for converting data samples obtained by sampling an AEC having a first frequency at a sampling frequency corresponding to an AEC having a second frequency. In one embodiment, an IED samples the AEC of the generator and the AEC of the intertie at a sampling frequency corresponding to the frequency of the generator. The sampling frequency corresponds to a sampling rate multiplied by a system frequency. The sampling rate may, for example, be 32 samples per cycle. If the generator is starting up, or for some other reason the system frequency of the generator has a system frequency that is different from the frequency of the AEC of the intertie, the data samples corresponding to the AEC of the intertie may require conversion in order to compensate for the disparity between the rate at which the AEC was sampled and the actual frequency. Disclosed herein are systems and methods for determining when such a conversion is necessary and for performing such a conversion.

The steps and exact functions of the algorithms illustrated and described may be manipulated or otherwise modified, yet still perform substantially the same conversion process. Particularly, the mathematical manipulations may be performed in various orders and in various manners. The method may be performed using any number of data manipulations, equations, matrices and/or mathematical approximations. The exemplary algorithms and numerical manipulations set forth herein are not intended to limit the scope of the disclosure, but rather are provided to illustrate several exemplary embodiments.

As used herein, the term "current" and variations thereof refers to the flow of electrical current, and is not indicative of time. In contrast, the words "previous" and "present" are used throughout the description and subsequent claims to indicate time or the order of events, unless context requires otherwise.

As used herein, the term "sampling frequency" refers to a system frequency multiplied by a sampling rate. For example, if a system frequency is 60 Hz and a sampling rate is 32 samples per cycle, the sampling frequency is equal to 1920 (60*32) Hz. In this example, a sampling clock may be set to sample data each 1/1920 th of a second.

As used herein, the term "sampling rate" refers to the number of samples obtained per cycle. A wide range of sampling frequencies may be utilized in connection with the present disclosure. In some embodiments, for example, a sampling rate may be equal to 32 samples per cycle. In other embodiments, a sample rate may be equal to 16 samples per cycle.

As used herein, the term "intelligent electronic device" or IED refers to any microprocessor-based device that monitors, controls, automates, and/or protects equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment, and may control various aspects relating to the monitored equipment. IEDs may receive information concerning monitored equipment using sensors, transducers, actuators, and the like.

Several aspects of the embodiments described below will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

FIG. 1 illustrates an IED 102 configured to monitor and protect a generator 180 and an intertie connection 110. Intertie connection 110 may connect to a power grid (not shown). According to various embodiments, intertie 110 is configured to carry an AEC, and generator 180 is configured to generate an AEC.

As illustrated in FIG. 1, IED 102 is configured to monitor and protect both generator 180 and intertie 110 by selectively actuating breakers 150 and 155. In FIG. 1, electrical power may be provided to load 185 by generator 180 or intertie 110. When BK2 155 is open and BK1 150 is closed, power is provided from intertie 110 to load 185. Similarly, if BK1 150 is open and BK2 155 is closed, power is provided from generator 180 to load. If both BK1 150 and BK2 155 are closed, power may be provided to load 185 by both intertie 110 and generator 180.

IED 102 may track electrical characteristics of the AEC produced by generator 180 and the AEC transmitted by intertie 110. IED 102 may be configured to measure the frequency, phase, magnitude, and other attributes of both the AEC produced by generator 180 and the AEC carried by intertie 110 to ensure that specified conditions are satisfied before closing breaker BK2 155. According to one embodiment, breaker BK2 155 is not closed until the phase, voltage magnitude, and frequency of the AEC of generator 180 is approximately equal to the phase, voltage magnitude, and frequency of the AEC of intertie 110.

Once the AEC of generator 180 and the AEC of intertie 110 satisfy one or more specified conditions, IED 102 may actuate breaker BK2 155, and generator 180 may supply power to intertie 110. In some embodiments, IED 102 monitors both the AEC of generator 180 and the AEC of intertie 110 after BK2 155 is closed. If IED 102 detects certain conditions, such as a fault or overcurrent, it may actuate BK1 150 to disconnect intertie 110 from generator 180.

BK2 155 may be selectively actuated to connect generator 180 to load 185. When BK2 155 is closed, generator 180 is connected to load 185. When BK2 155 is closed, PT2 133 may measure the output of generator 180 under load 185. With BK2 155 closed and BK1 150 open, generator 180 is connected to load 185 but not to utility intertie 110.

As illustrated in FIG. 1, IED 102 is communicatively connected to voltage (or potential) transformers (PTs) 130, 133, and 135 and current transformers (CTs) 140, 143, and 145. PTs 130, 133, and 135 and CTs 140, 143, and 145, allow IED 102 to measure voltages, currents, and other electrical characteristics at various points in system 100. PTs and CTs may be coupled to IED 102 via various inputs. PT2 133 is configured to allow IED 102 to measure a portion of system 100 between breakers 150 and 155. PT3 135 is configured to allow IED 102 to measure the output of generator 180. CT1 140 is configured to allow IED 102 to measure an AEC on intertie 110. CT2 143 is configured to allow IED 102 to measure the grounded side current of the generator 180, and CT3 145 measures the current flow at ground.

According to one embodiment, IED 102 measures the frequency of the AEC of generator 180 and the frequency of the AEC of intertie 110 via one or more PTs 130, 133, 135 and/or CTs 140, 143, 145. When generator 180 starts up, IED 102 may be configured to adjust its sampling frequency based on the AEC frequency of generator 180. Since the AEC frequency of intertie 110 is likely different than the AEC frequency of generator 180, IED 102 either would include two different data acquisition systems, or would include a mechanism for correcting any error introduced by the difference in frequency. Certain embodiments may include two different data acquisition systems in IED 102; however, the cost of IED 102 may be increased by the inclusion of an additional data acquisition system. In other embodiments, data conversion module 105 may be configured to compensate for difference in frequency between generator 180 and utility intertie 110.

Alternative embodiments of system 100 may include more or fewer CTs and/or PTs and/or other measurement devices configured to allow IED 102 to measure various aspects of system 100, such as current, voltage, and/or frequency. Likewise, system 100 may include one or more breakers, as illustrated in FIG. 1 or in alternative locations. System 100 may be also adapted to accommodate any number of phases of electrical power (e.g., three-phase power). In such embodiments, each phase of power may have related breakers.

In the illustrated embodiment, IED 102 includes a processor 107, a memory, and a data conversion module 105. A data bus 108 may provide a communication link between processor 107 and memory 109. Processor 107 may operate using any number of processing rates, architectures, and may be implemented using a general purpose or application specific processor. Processor 107 may be configured to perform various algorithms and calculations described herein. Processor 107 may be embodied as a general purpose integrated circuit, an application specific integrated circuit, a field-programmable gate array, and other programmable logic devices.

IED 102 may include a memory 109. Memory 109 may be implemented using a variety of technologies, including hard drives, floppy diskettes, RAM, solid-state memory devices, and other storage media suitable for storing electronic instructions and other data. Certain embodiments may be provided as a computer program product including a computer-readable storage medium having stored instructions thereon that may be used to program a computer (or other electronic device) to perform processes described herein.

Memory 109 may be the repository of software modules or other computer readable instructions utilized by IED 102. In particular, data conversion module 105 may reside on memory 109. Data conversion module 105 may perform a method, such as the method illustrated in FIG. 2, for converting data samples obtained by sampling an AEC having a first frequency at a sampling frequency corresponding to a second AEC frequency.

Memory 109 may also be the repository of a frequency calculation module 111, which may be configured to determine the AEC frequency of intertie 110 or the AEC frequency of generator 180. In one embodiment, frequency calculation module 111 may determine instances of zero-crossings of a waveform, such as a voltage waveform or a current waveform. Using the instances of the zero-crossings of electric waveform, frequency calculation module 111 may be capable of determining the frequency of a waveform:

$$\text{Frequency of Waveform} = \frac{1}{2 \cdot (T_{ZC2} - T_{ZC1})} \quad (1)$$

where:
$T_{ZC1}$ is a time of a first zero crossing; and,
$T_{ZC2}$ is a time of the subsequent zero crossing.

In another embodiment, frequency calculation module 111 may calculate times of peaks of a waveform. In yet another example, the frequency calculation module 111 may use a positive-sequence phasor ("PSP"), such as a positive sequence voltage phasor or a positive sequence current phasor, to calculate the signal frequency. Although the following example describes a technique of calculating the signal frequency using the positive-sequence voltage phasor, the positive-sequence current phasor may be calculated and used in place of the positive-sequence voltage phasor. In a three-phase electrical power system, phasors for each phase are used to calculate the positive-sequence phasor. For example, the positive-sequence voltage phasor is calculated using the voltage phasors from each phase using:

$$V_1 = \frac{1}{3}(V_A + aV_B + a^2V_C) \quad (2)$$

where:
$V_1$ is the positive-sequence voltage phasor;
$V_A$, $V_B$, and $V_C$, are voltage phasors for each of the three phases at a particular point on the electrical power system; and
a is the complex number $\alpha = 1 < 120°$.

Figure 2:
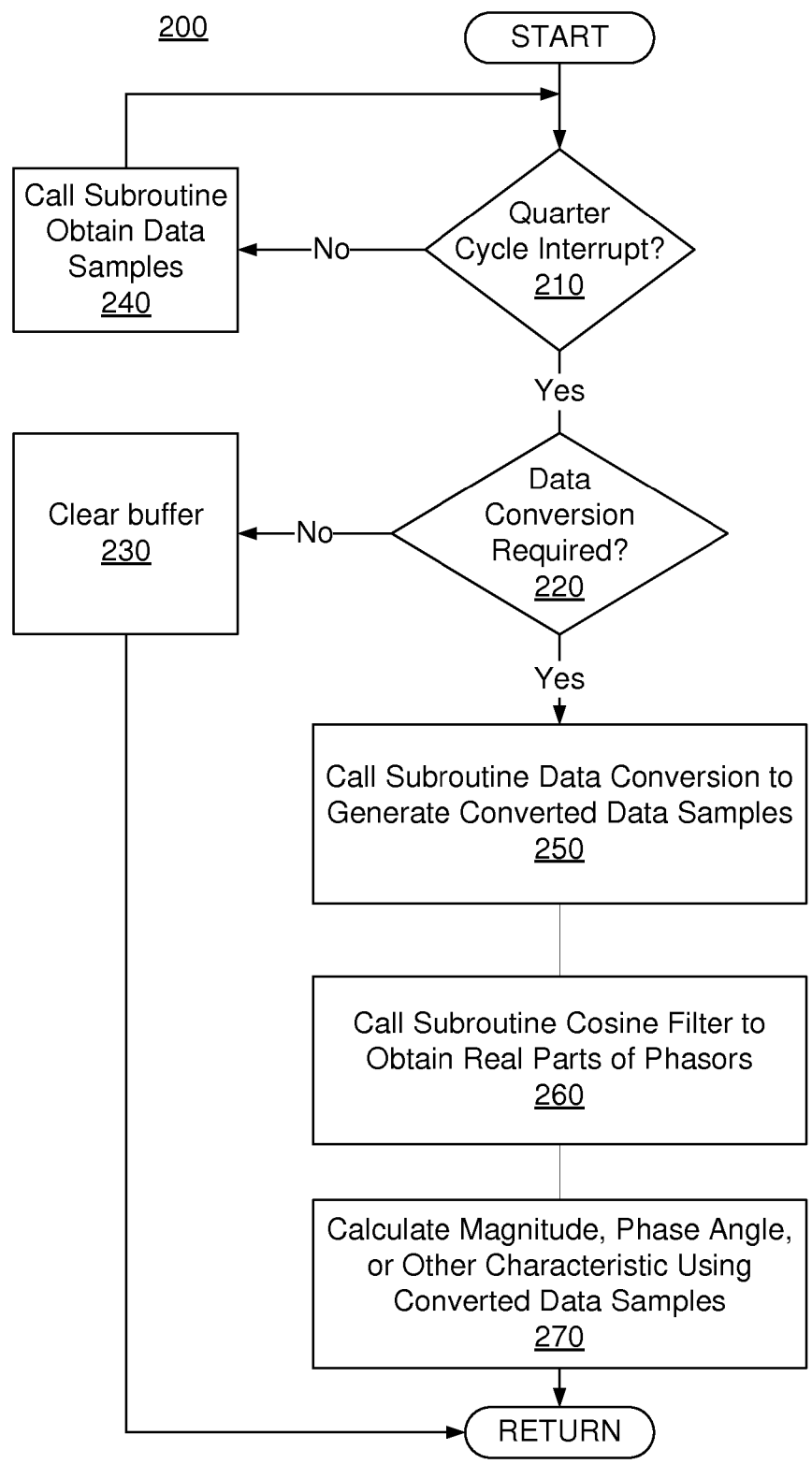
FIG. 2 illustrates a method of sampling an alternating electric current and converting data samples to compensate for a difference between a frequency of the alternating electric current and another system frequency of an alternating electric current, according to one embodiment.

In an example that will be referred to in describing FIG. 2 and throughout this disclosure, IED 102 (shown in FIG. 1) is configured to sample both intertie 110 and generator 180 at the same sampling frequency, which may be set based on the frequency of generator 180. In one example, IED 102 is configured to sample the electrical signals at various sample points in system 100 thirty-two times per cycle of the AEC of generator 180 (i.e., system 100 has a sampling rate of 32 samples per cycle). In this example, the sampling frequency of system 100 approximately corresponds to the frequency of generator 180, and the data samples associated with intertie 110 may require conversion. Of course, in other examples, the sampling frequency may correspond to the frequency of intertie 110, and the data samples associated with generator 180 may require conversion. In still other examples, some fixed or arbitrary value may be chosen as the sampling frequency, and a set of data samples associated with generator 180 and a set of data samples associated with intertie 110 may require conversion.

FIG. 2 illustrates one embodiment of a method 200 of collecting and converting a set of data samples of an AEC having a first frequency at a sampling frequency corresponding to a second AEC frequency. Method 200 may be performed each quarter cycle 210 of the AEC produced by generator 180. Performing data conversion each quarter cycle of the AEC may be advantageous because certain attributes of the AEC may be calculated using any two real parts of a phasor corresponding to data samples a quarter cycle apart. For example, samples separated by a quarter cycle may be used to calculate the voltage magnitude and phase angle of a sampled AEC. One method of calculating the magnitude is provided in the following equations, in which one cycle is equal to 32 steps, or values of k. Steps are referred to in the following equations and throughout this disclosure as k. Where one cycle is equal to 32 steps, one quarter cycle is equal to 8 steps.

$$\text{Magnitude of Voltage} = \sqrt{(\text{REAL\_V}(k))^2 + (\text{REAL\_V}(k-8))^2} \quad (3)$$

$$\text{Magnitude of Current} = \sqrt{(\text{REAL\_I}(k))^2 + (\text{REAL\_I}(k-8))^2} \quad (4)$$

If a sampling rate other than 32 is used, equations 3 and 4 may be modified to ensure that the two real parts are a quarter cycle apart. Additionally, alternative methods known to one having skill in the art for calculating the magnitude of the voltage and/or current are also possible.

A voltage and/or current phase angle may also be calculated using two real parts of phasors corresponding to data samples a quarter cycle apart. One method of calculating the voltage and/or current phase angle is provided in the following equations (5) and (6).

$$\text{Phase angle of Voltage} = \tan^{-1}\left[\frac{\text{P\_REAL\_V}(k-8)}{\text{P\_REAL\_V}(k)}\right] \quad (5)$$

$$\text{Phase angle of Current} = \tan^{-1}\left[\frac{\text{P\_REAL\_I}(k-8)}{\text{P\_REAL\_I}(k)}\right] \quad (6)$$

If a sampling rate other than 32 samples per cycle is used, the equations set forth above may be modified to ensure that the two real parts are a quarter cycle apart. Additionally, alternative methods for calculating the magnitude and phase may be utilized. In various embodiments, data conversion may be performed more or less frequently than every quarter of a cycle. Any suitable method for calculating characteristics of an AEC may be used in conjunction with the systems and methods disclosed herein.

Method 200 calls Subroutine Obtain Data Samples 240 if a quarter cycle of data is not ready to be processed. One exemplary embodiment of Subroutine Obtain Data Samples 240 is discussed below in connection with FIG. 3. The data samples obtained by Subroutine Obtain Data Samples are stored in a computer readable buffer. After a quarter cycle of data has been stored in the buffer, system 200 determines whether data conversion is necessary 220. As will be described below in reference to FIG. 11, data conversion may only be necessary when there is a sufficient discrepancy between some characteristic, such as frequency, of the AEC of the generator and the AEC of the intertie. If data conversion is not necessary, the buffer is cleared 230, method 200 returns, and method 200 begins again.

If data conversion is necessary, method 200 calls Subroutine Data Conversion 250 to generate converted data samples. Subroutine Data Conversion 250 may be called to generate converted data samples by using a conversion algorithm to compensate for a frequency difference between an AEC of the generator and an AEC of the intertie, or to compensate for some other difference. One exemplary embodiment of Subroutine Data Conversion 250 is discussed below in connection with FIG. 4. The converted data samples are passed to Subroutine Cosine Filter 260 to obtain real parts of phasors. One exemplary embodiment of Subroutine Cosine Filter 260 is discussed below in connection with FIG. 5. Finally, at step 270, system 200 calculates a magnitude, phase angle, or other characteristic of the converted data samples.

Figure 3:
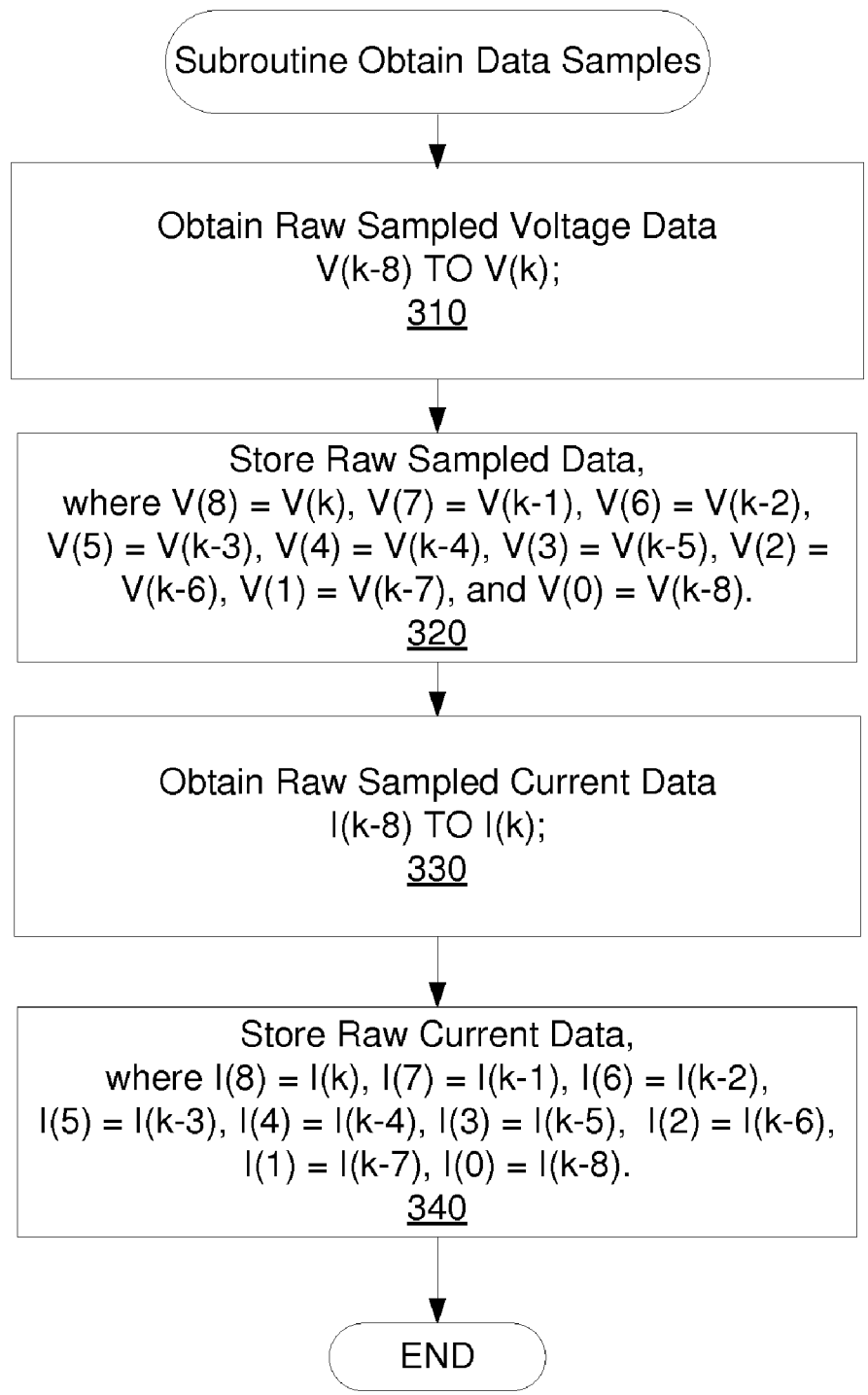
FIG. 3 illustrates a subroutine of the method of FIG. 2 of sampling an alternating electric current at a sampling rate of 32 samples per cycle, according to one embodiment.

FIG. 3 illustrates one embodiment of Subroutine Obtain Data Samples 240. According to various embodiments, data samples may be processed in real time or in periodic increments, such as quarter cycle increments, full cycle increments, or after a predetermined number of data samples have been obtained. As an example, where k is the present sample step, data samples V(k–8) to V(k) may be obtained 310 and stored 320. That is, the various voltage samples V(k–8) to V(k) are indexed according to k and stored respectively within a memory or other computer-readable medium. Similarly, current data samples as I(k–8) to I(k) may be obtained 330 and stored 340. According to some embodiments, including the embodiment illustrated in FIG. 2, the voltage and/or current samples are processed in quarter cycle increments. However, in other embodiments, the storing and processing of data samples may be done in smaller or larger increments.

Figure 4:
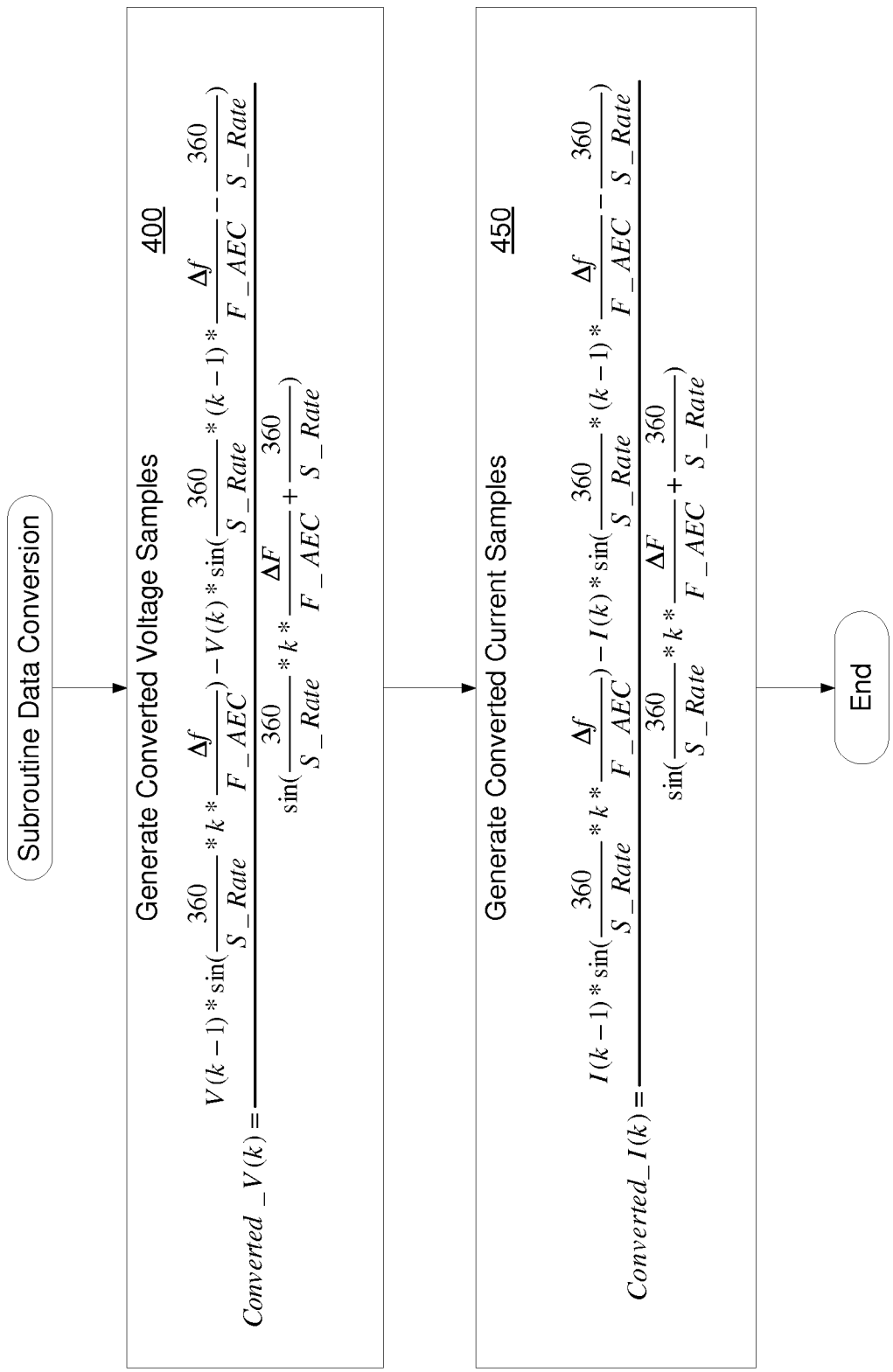
FIG. 4 illustrates a subroutine of the method of FIG. 2 of converting data samples to compensate for a difference between the frequency of an alternating electric current at the intertie and the frequency of an alternating electric current at the generator, according to one embodiment.

Subroutine Obtain Data Samples may use a sampling frequency corresponding to a sampling frequency different from a system frequency of an AEC. As such, it may be necessary to convert the data samples obtained prior to performing calculations. After obtaining the data samples, the data samples may be converted by Subroutine Data Conversion, an embodiment of which is illustrated in FIG. 4. At step 400 converted voltage samples are generated, and at step 450 converted current samples are generated. As an example, the following equations may be used to generate a converted voltage data sample and a converted current data sample, respectively.

$$\text{Converted\_V}(k) = \frac{V(k-1)*\sin\left(\frac{360}{\text{S\_Rate}}*k*\frac{\Delta F}{\text{F\_AEC}}\right) - V(k)*\sin\left(\frac{360}{\text{S\_Rate}}*(k-1)*\frac{\Delta F}{\text{F\_AEC}} - \frac{360}{\text{S\_Rate}}\right)}{\sin\left(\frac{360}{\text{S\_Rate}}*k*\frac{\Delta F}{\text{F\_AEC}} + \frac{360}{\text{S\_Rate}}\right)} \quad (7)$$

$$\text{Converted\_I}(k) = \frac{I(k-1)*\sin\left(\frac{360}{\text{S\_Rate}}*k*\frac{\Delta F}{\text{F\_AEC}}\right) - I(k)*\sin\left(\frac{360}{\text{S\_Rate}}*(k-1)*\frac{\Delta F}{\text{F\_AEC}} - \frac{360}{\text{S\_Rate}}\right)}{\sin\left(\frac{360}{\text{S\_Rate}}*k*\frac{\Delta F}{\text{F\_AEC}} + \frac{360}{\text{S\_Rate}}\right)} \quad (8)$$

In the above equations, sampling rate (S_Rate) multiplied by a frequency of the AEC (F_AEC) is the sampling frequency. In various embodiments, the sampling frequency may be S_Rate multiplied by the frequency of the AEC of the generator, or the sampling frequency may be S_Rate multiplied by the frequency of the AEC of the intertie. The difference between the frequency of the AEC of the generator and the frequency of the AEC of the intertie is represented as ΔF.

A converted voltage sample V(k), where k is the present sample, may be obtained by using a present voltage data sample (e.g., V(k)), a previously obtained voltage data sample (e.g. V(k−1)), an AEC frequency (e.g., the frequency of the AEC of the generator or the frequency of the AEC of the intertie), and a cycle-based sampling rate, S_Rate. S_Rate is determined by the number of samples per cycle of a system frequency, and consequently determines an angle shift of each sample. For example, if the sampling rate, S_rate, is 32 samples per cycle, the angle shift of each sample equals to 11.25° because a full period of 360° divided into 32 equal samples is 11.25°. Each stored voltage and each stored current obtained from Subroutine Obtain Data Samples (e.g., V(0) through V(8) and I(0) through I(8)) may be similarly processed. A processor may be configured to simultaneously perform a conversion algorithm on 8 data samples, representative of a quarter cycle of an AEC sampled at a sampling rate of 32 samples per cycle. Alternatively, the processor may be configured to perform sequential processing of two data samples as soon as they are obtained, or to perform the processing only after data samples representative of one or more complete cycles have been obtained.

According to the embodiment illustrated in FIG. 4, a method for generating a converted data sample includes multiplying a previous data sample (e.g., V(k−1)) by a periodic function of a present sampling step, a cycle-based sampling rate, and a system frequency of the sampled AEC $$\left(e.g., \sin\left(\frac{360}{S\_Rate} * k * \frac{\Delta F}{F\_AEC}\right)\right);$$

then subtracting the product of a present data sample (e.g., V(k)) multiplied by a periodic function of the previous sampling step, the cycle-based sampling rate, and the system frequency of the sampled AEC $$\left(e.g., \sin\left(\frac{360}{S\_Rate} * k * \frac{\Delta F}{F\_AEC} - \frac{360}{S\_Rate}\right)\right);$$

and finally dividing the difference by a period function of the sampling rate, the cycle based sampling rate, and the system frequency of the sampled AEC $$\left(e.g., \sin\left(\frac{360}{S\_Rate} * k * \frac{\Delta F}{F\_AEC} + \frac{360}{S\_Rate}\right)\right).$$

Figure 5:
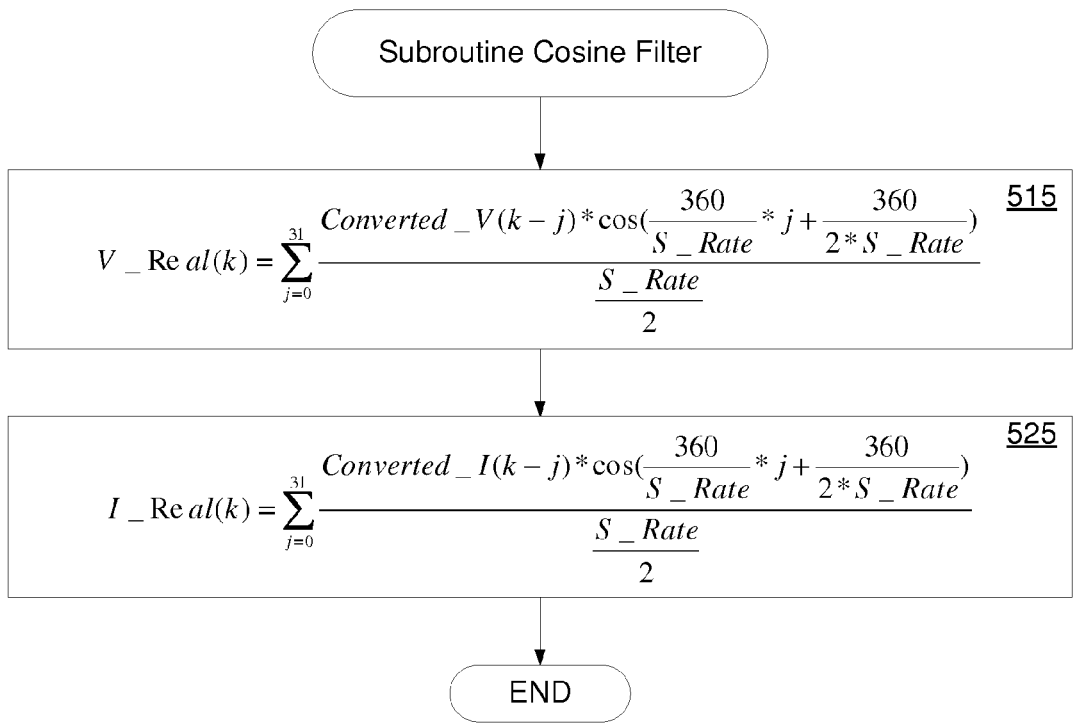
FIG. 5 illustrates a subroutine of the method of FIG. 2 of using a cosine filter used to obtain a real part of a phasor from collected data samples corresponding to an alternating electric current, according to one embodiment.

Once converted data samples have been generated, Subroutine Cosine Filter may be used to obtain the real parts of the phasors representative of the sampled AEC. FIG. 5 illustrates one exemplary embodiment of Subroutine Cosine Filter. At step 515, Subroutine Cosine Filter employs the illustrated equation for obtaining the real parts of the phasors V_Real(k) of the voltage, while at step 525, Subroutine Cosine Filter employes the illustrated equation for obtaining the real parts of the phasors I_Real(k) of the current. As illustrated, according to one exemplary embodiment, the equations include a summation of a full cycle of converted data samples to obtain a single real part of a phasor. Alternative embodiments include half-cycle cosine filters, configured to generate the real part of a phasor using only enough data samples to represent a half-cycle. In certain embodiments, at step 515 and 525, values of Converted_V(0) through Converted_V(−31) may be initialized to zero if the available sampled data is less than a full cycle (e.g., 32 samples in the illustrated embodiment).

According to various embodiments, after an initial number of data samples are converted, an additional real part of a phasor is generated for each additional converted data sample provided. In one example having a sampling rate of 32 samples per cycle, after 32 converted data samples are input, Subroutine Cosine Filter generates one real part of a phasor for each additional converted data sample provided. According to alternative embodiments, fewer than the number of converted data samples required to represent a full cycle of the AEC may be used to generate real parts of phasors because the algorithm is running each quarter cycle.

FIGS. 6-10B illustrate graphically one method of converting data samples according to the systems and methods disclosed herein. Throughout FIGS. 6-10B the horizontal axes of the graphs is a sampling step, k. In the illustrated example, the sampling step, k, is equal to 32 samples per cycle of a 40 Hz AEC. The vertical axes represent magnitude. The graphs are merely approximations and may not reflect exact calculations.

FIG. 6 illustrates a waveform 620 representative of an AEC with a frequency of 40 Hz and a magnitude of 1 sampled at a sampling rate of 32 samples per cycle of a 40 Hz AEC. FIG. 6 also illustrates a magnitude calculation 610 of waveform 620 calculated using Eq. 3. Waveform 620 has a constant magnitude 610 of 1. It may be noted that magnitude calculation 610 lags behind waveform 620 by 8 samples, or one quarter cycle, because Eq. 3 requires two points separated by one quarter cycle.

FIG. 7 illustrates a waveform 740 representative of an AEC with a frequency of 60 Hz and a magnitude of 1 sampled at a sampling rate of 32 samples per cycle of a 40 Hz AEC. In comparing waveform 620, shown in FIG. 6, to waveform 740, the higher frequency may be noted. Unlike waveform 620, shown in FIG. 6, waveform 740 is not periodic every 32 samples. Accordingly, a magnitude calculation 730 determined according to Eq. 3 is not accurate. Magnitude calculation 730 is not accurate because eight samples, or eight values of k, do not correspond to one quarter cycle of waveform 740.

Figure 8:
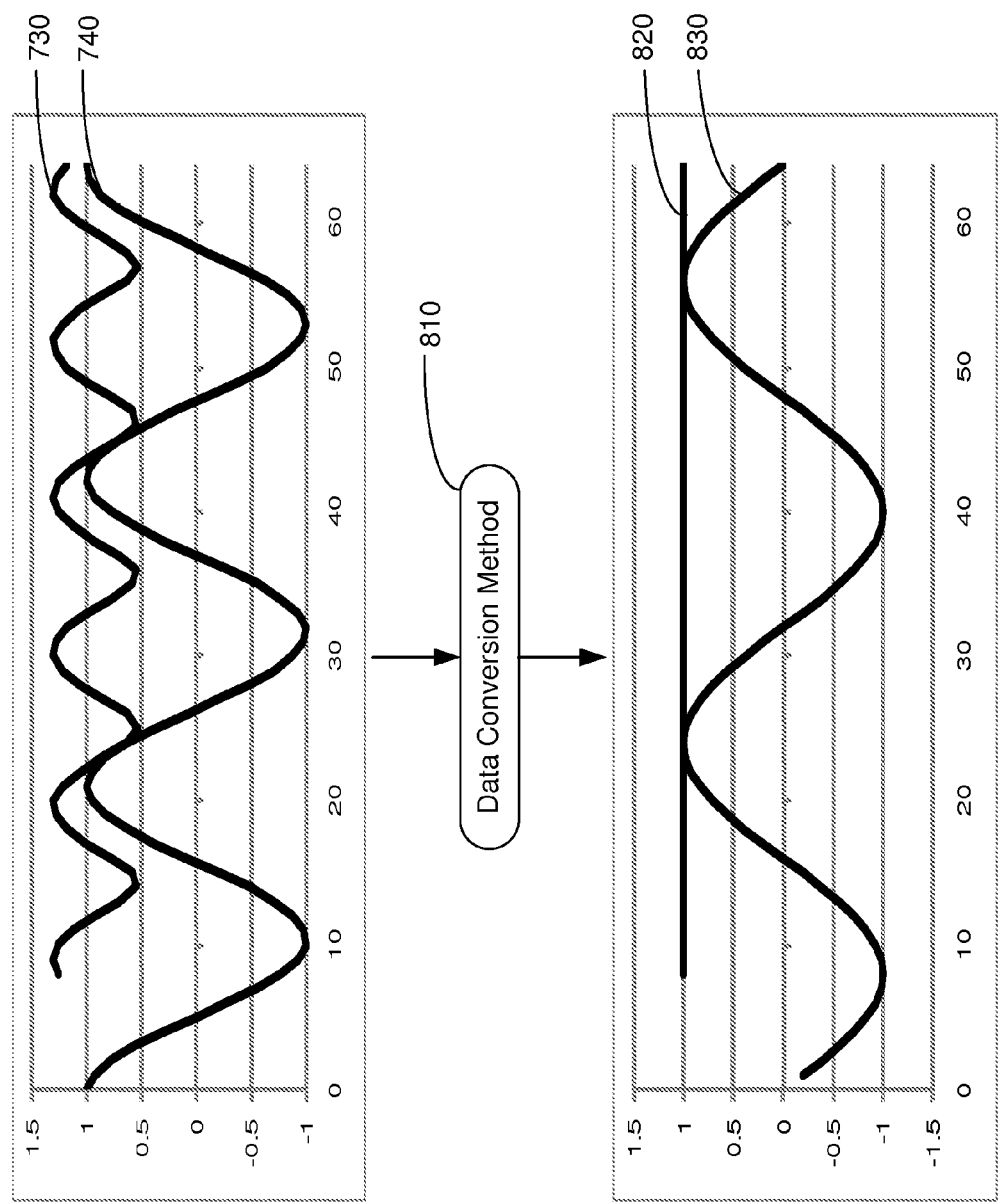
FIG. 8 graphically illustrates a 60 Hertz waveform sampled at a sampling frequency of 1280 (40*32) Hertz being converted to calculate accurate magnitudes, according to one embodiment.

FIG. 8 illustrates graphically the conversion of data using the above described methods. Waveform 740 and magnitude calculation 730 are the same as in FIG. 7. As illustrated in FIG. 8, the data to be converted (e.g. waveform 740) is processed by a data conversion method 810. Data conversion method 810 may be an embodiment of the method 200 illustrated in FIG. 2, or some other embodiment. The output of data conversion method 810 shows a converted waveform 830 and a converted calculated magnitude 820. In the illustrated embodiment, Eq. 7 is employed to generate converted waveform 830, and Eq. 3 is employed to generate converted calculated magnitude 820. As illustrated, converted calculated magnitude 820 is equal to 1.

Returning to a discussion of FIG. 1, in addition to actuating breakers 150 and 155 to connect generator 180 to intertie 110, IED 102 may also be configured to protect generator 180 and/or intertie 110 from overcurrent or other fault situations. According to one embodiment, an IED 102 is capable of detecting a fault associated either with generator 180 and/or the intertie 110. In embodiments where IED 102 samples at a sampling frequency corresponding to the system frequency of the AEC of generator 180, it may be necessary to use an asynchronous data sampling conversion method described herein to assure that the calculated intertie AEC attributes are accurate.

According to one exemplary embodiment, IED 102 protects against faults by monitoring the magnitude of the current. If the magnitude of the current rises above a threshold magnitude, changes abruptly, fluctuates, or falls below a threshold magnitude, IED 102 may respond by actuating breaker 150 and/or alerting a technician.

FIG. 9A illustrates a waveform 910 representative of an AEC changing in magnitude from 1 to 1.5. FIG. 9B is a graphical representation of the change in magnitude 920 of the waveform of FIG. 9A. As illustrated, the magnitude changes over approximately one cycle (32 sample points) from 1 to 1.5. According to some embodiments, the method may result in minimal overshoot of the actual magnitude. However, according to alternative embodiments, using higher sampling rates and/or a greater number of data samples in each calculation the overshoot is minimized or removed completely.

Figure 10A:
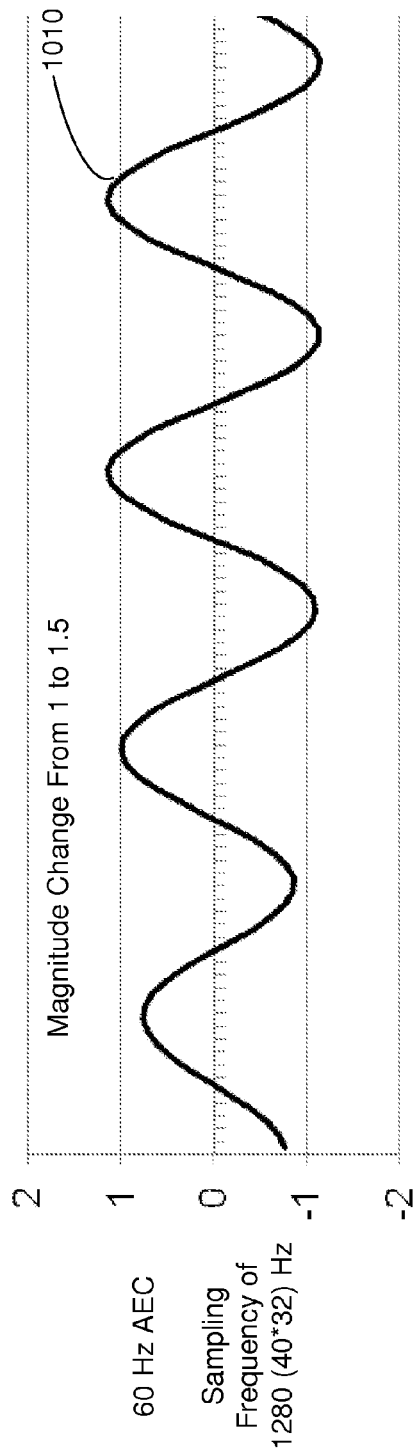
FIG. 10A illustrates a 60 Hertz waveform whose magnitude changes from 1 to 1.5 reconstructed from data samples taken at a sampling frequency corresponding to a system frequency of 40 Hertz, according to one embodiment.
Figure 10B:
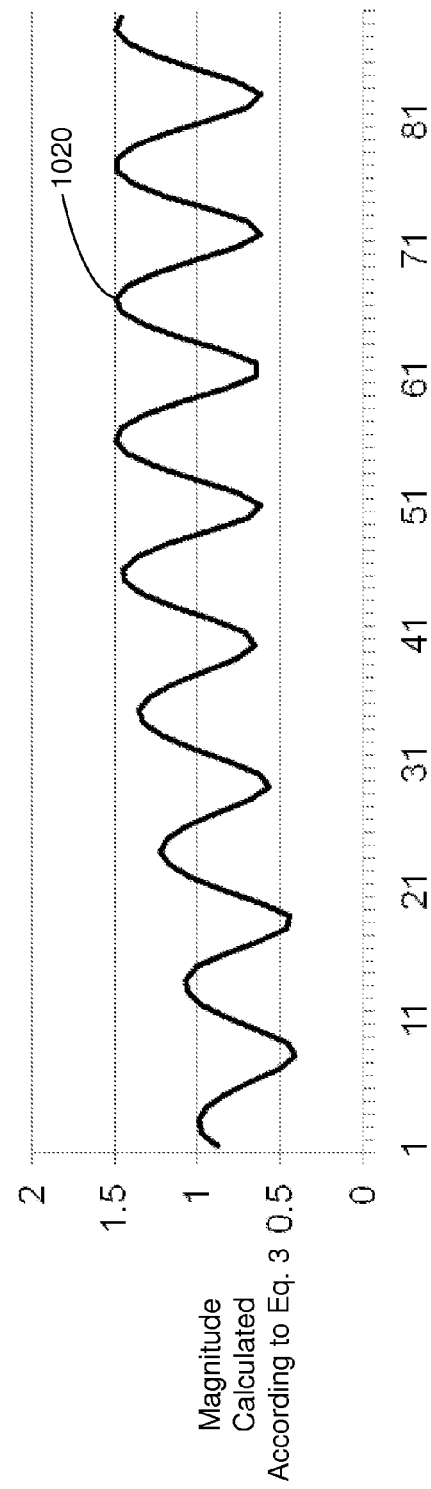
FIG. 10B illustrates a magnitude calculation from the data samples of FIG. 10A, according to one embodiment.

In contrast, FIG. 10A illustrates a 60 Hz waveform 1010 of unconverted data samples obtained by sampling the same AEC of FIG. 9A using a sampling rate of 32 samples per cycle corresponding to a system frequency of 40 Hz. As Illustrated in FIG. 10B, a resulting calculated magnitude 1020 generating using Eq. 3 is erroneous. Calculated magnitude 1020 depicts an oscillating waveform that inadequately represents the magnitude transition from 1 to 1.5. Utilizing data conversion techniques described herein, data samples comprising waveform 1010 may be converted, and a resulting calculated magnitude may accurately illustrate the transition from a magnitude of 1 to a magnitude of 1.5.

Figure 11:
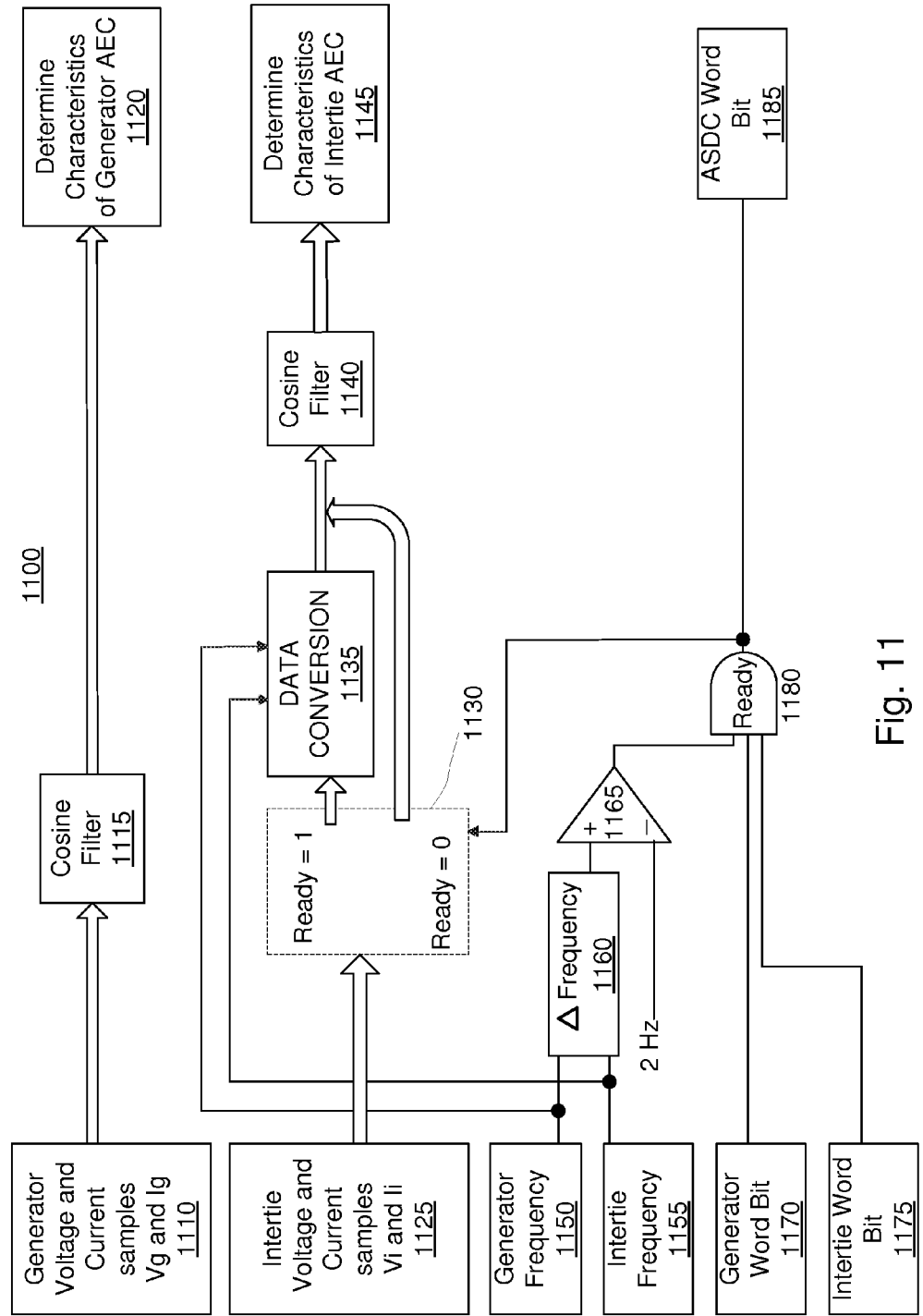
FIG. 11 is a functional block diagram illustrating a method of asynchronous sampling data conversion, according to one embodiment.

FIG. 11 illustrates a function block diagram of a system 1100 for determining when data conversion may be required and for converting data samples. In the embodiment illustrated in FIG. 11, system 1100 utilizes a sampling frequency that is approximately equal to the product of a frequency of an AEC from a generator (not shown) and S_rate (e.g., 32 samples per cycle). The sampling frequency is used to sample an AEC produced by the generator and an AEC carried by an intertie. System 1100 obtains voltage (Vg, Vi) and/or current (Ig, Ii) data samples 1110 and 1125 of both the AEC produced by the generator and the AEC carried by the intertie. As illustrated, no data conversion is required for generator voltage (Vg) and/or current (Ig) data samples because the sampling frequency is approximately equal to the product of the actual frequency of the AEC of the generator and S_rate (e.g., 32 samples per cycle). Accordingly, after passing the collected generator voltage (Vg) and/or current (Ig) data samples through a Cosine Filter 1115, system 1100 may determine various characteristics of the AEC 1120 produced by the generator, including phase angles and magnitudes.

As indicated above, the sampling frequency of system 1100 is approximately equal to the product of frequency of the AEC of the generator and S_rate (e.g., 32 samples per cycle). In some situations, the sampling frequency may differ from the value of frequency of the AEC of the intertie multiplied by S_rate. Consequently, intertie voltage and current samples (Vi) and/or current (Ii) data samples 1125 may be passed through data conversion 1135. Data conversion 1135 generates converted data samples, which may be passed to a cosine filter 1140. System 1100 may then determine various characteristics of the intertie AEC 1145. In certain embodiments, cosine filter 1115 and cosine filter 1140 may be implemented as a single cosine filter.

According to the illustrated embodiment, system 1100 determines whether data conversion 1135 of voltage samples and/or current samples is necessary using the difference between the frequency of the AEC of the intertie and the frequency of the AEC of the generator. Where the difference between these frequencies is less than a threshold (e.g., 2 Hz in the illustrated embodiment), the data samples may not require data conversion 1135. As illustrated in FIG. 11, according to one embodiment the generator frequency 1150 and the intertie frequency 1155 are used to determine a delta frequency 1160. A comparator 1165 is used to compare delta frequency 1160 with a 2 Hz threshold frequency. According to alternative embodiments, the threshold frequency may be as low as 0 Hz or as high as desired.

According to one embodiment, the output of a comparator 1165, together with a generator word bit 1170 and an intertie word bit 1175. These signals are inputs to logic gate 1180. The output of logic gate 1180 determines whether intertie voltage and current samples are passed to data conversion 1135. The output of logic gate 1180 may also be an output of system 1100 as an asynchronous sampling data conversion word bit 1185. When the output of the comparator 1165 and word bits 1170 and 1175 are high (e.g., are a logical 1) the delta frequency 1160 is greater than 2 Hz, and a switch 1130 is actuated, directing collected data samples 1125 through data conversion 1135. According to one such embodiment, when the delta frequency 1160 is less than 2 Hz, no data conversion is needed and the switch 1130 directs collected data samples 1125 directly through cosine filter 1140. System 1100 may then determine various characteristics of the intertie AEC 1145. In one embodiment, the generator word bit is equal to 1 if generator frequency measurement is correct (e.g., the signal is strong enough for zero-crossing detection logic to measure the frequency). The intertie word bit is equal to 1 if intertie frequency measurement is correct (e.g., the signal is strong enough for zero-crossing detection logic to measure the frequency). Generator word bit 1170 and intertie word bit 1175 may be utilized to indicate that data conversion 1135 may rely on the generator frequency 1150 and the intertie frequency 1155. The ASDC word bit is the indication of when data are processed through data conversion 1135. ASDC word bit 1185 may be utilized in analysis to verify conditions in case of a fault.

In an alternative embodiment, a sampling frequency may correspond to a predetermined sampling frequency. Such a predetermined sampling frequency may or may not be a constant frequency. According to some embodiments, the predetermined sampling frequency is user selected, constant, or based on the measured frequencies of the AEC of the generator, the AEC of the intertie, and/or other conditions within the system.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for selectively connecting a first electrical system and a second electrical system, the method comprising:

sampling a first alternating electric current of the first electrical system including a generator and having a first frequency at a sampling frequency to obtain a first set of data samples, the sampling frequency corresponding to a system frequency of the first electrical system or the second electrical system multiplied by a sampling rate;

sampling a second alternating electric current of the second electrical system including an interne and having a second frequency at the sampling frequency to obtain a second set of data samples;

converting at least one of the first set of data samples and the second set of data samples to a converted set of data samples using a conversion algorithm to compensate for a frequency difference between the first frequency and the second frequency;

determining when the converted set of data samples and at least one of the first set of data samples and the second set of data samples satisfy a predetermined condition; and actuating a breaker when the predetermined condition is satisfied to selectively connect together the first electrical system and the second electrical system.

2. The method of claim 1, wherein the sampling frequency is approximately equal to the product of the first frequency and the sampling rate.

3. The method of claim 2, wherein the second set of data samples are converted into the converted set of data samples and wherein the system frequency corresponds to the second frequency.

4. The method of claim 1, wherein the sampling frequency is approximately equal to the product of the second frequency and the sampling rate.

5. The method of claim 4, wherein the first set of data samples are converted into the converted set of data samples and wherein the system frequency corresponds to the first frequency.

6. The method of claim 1, wherein the system frequency is a predetermined frequency; and wherein the first set of data samples and a second set of data samples are converted to the converted set of data samples.

7. The method of claim 1, wherein the first set of data samples and the second set of data samples each comprise at least a present data sample and a previous data sample.

8. The method of claim 1, wherein the conversion algorithm comprises a method of:
determining a difference between:
a previous data sample multiplied by a first periodic function of a sampling step, the first frequency and the second frequency; and
a present data sample multiplied by a second periodic function of the sampling step, the first frequency and the second frequency; and
dividing the difference by:
a third periodic function of the sampling step, the first frequency and the second frequency.

9. The method of claim 1, further comprising determining an attribute of at least one of the first alternating electric current and the second alternating electric current using two data samples separated by one quarter cycle from the converted set of data samples, the attribute selected from the group consisting of a voltage magnitude, a voltage phase angle, a current magnitude and a current phase angle; and
using the attribute to determine if the predetermined condition is satisfied.

10. The method of claim 1, further comprising determining a real part of a phasor within the converted set of data samples using a cosine filter.

11. The method of claim 1, further comprising:
generating the first alternating electric current using the generator; and
carrying the second alternating electric current on the intertie.

12. An intelligent electronic device (IED) configured to selectively connect a first electrical system to a second electrical system, the IED comprising:
a first input configured to sample a first alternating electric current of the first electrical system including a generator and having a first frequency at a sampling frequency to obtain a first set of data samples, the sampling frequency corresponding to a system frequency multiplied by a sampling rate;
a second input configured to sample a second alternating electric current of the second electrical system including an intertie and having a second frequency at the sampling frequency to obtain a second set of data samples;
a processor;
a computer-readable storage medium in electrical communication with the processor, the computer-readable storage medium comprising:
a data conversion module executable on the processor and configured to compensate for a frequency difference between the first frequency of the first electrical system and the second frequency of the second electrical system, and to generate a converted set of data samples from at least one of the first set of data samples and the second set of data samples;
wherein the IED is configured to determine when the converted set of data samples and at least one of the first set of data samples and the second set of data samples satisfy a predetermined condition; and
wherein the IED is configured to actuate a breaker when the predetermined condition is satisfied to selectively connect together the first electrical system to the second electrical system.

13. The IED of claim 12, wherein the sampling frequency is approximately equal to the product of the first frequency and the sampling rate.

14. The IED of claim 13, wherein the second set of data samples are converted into the converted set of data samples and wherein the system frequency corresponds to the second frequency.

15. The IED of claim 12, wherein the system frequency is approximately equal to the product of the second frequency and the sampling rate.

16. The IED of claim 15, wherein the first set of data samples are converted into the converted set of data samples and wherein the system frequency corresponds to the first frequency.

17. The IED of claim 12, wherein the sampling frequency is a predetermined frequency; and
wherein the data conversion module is further configured to convert the first set of data samples into a first converted set of data samples, to convert the second set of data samples into a second converted set of data samples, and to use the first converted set of data samples and the second set of data samples to determine when the predetermined condition is satisfied.

18. The IED of claim 12, wherein the first set of data samples and the second set of data samples each comprise at least a present data sample and a previous data sample.

19. The IED of claim 12, wherein the data conversion module is further configured:

to determine a difference between:
- a previous data sample multiplied by a first periodic function of a sampling step, the frequency of the first alternating electric current, and the frequency of the second alternating electric current; and
- a present data sample multiplied by a second periodic function of the sampling step, the frequency of the first alternating electric current and the frequency of the second alternating electric current; and to divide the difference by:
- a third periodic function of the sampling step, frequency of the first alternating electric current and the frequency of the second alternating electric current.

20. The IED of claim 12, wherein the data conversion module is configured to determine an attribute of at least one of the first alternating electric current and the second alternating electric current using two data samples separated by one quarter wavelength from the converted set of data samples, the attribute selected from the group consisting of a voltage magnitude, a voltage phase angle, a current magnitude and a current phase angle; and
wherein the system is configured to use the attribute to determine if the predetermined condition is satisfied.

21. The IED of claim 12, wherein the data conversion module is further configured to utilize a cosine filter to determine a real part of a phasor within the converted set of data samples.

22. A system to selectively connect a first electrical system and a second electrical system, the system comprising:
a breaker configured to selectively connect the first electrical system to the second electrical system; and
an intelligent electronic device (IED) configured to sample the first alternating electric current of the first electrical system including a generator at a sampling frequency to obtain a first set of data samples, the sampling frequency corresponding to a system frequency multiplied by a sampling rate, and to sample the second alternating electric current of the second electrical system including an intertie at the sampling frequency to obtain a second set of data samples, the IED comprising:
a processor;
a computer-readable storage medium in electrical communication with the processor, the computer-readable storage medium comprising a data conversion module executable comprising computer instructions executable on the processor for performing a method of:
converting at least one of the first set of data samples and the second set of data samples to a converted set of data samples using a conversion algorithm to compensate for a frequency difference between the first frequency and the second frequency;
determining when the converted set of data samples and at least one of the first set of data samples and the second set of data samples satisfy a predetermined condition; and
wherein the IED actuates the breaker when the predetermined condition is satisfied to selectively connect together the first electrical system and the second electrical system.

* * * * *